United States Patent
Kelly et al.

(10) Patent No.: US 10,634,057 B2
(45) Date of Patent: Apr. 28, 2020

(54) AIRFLOW CONTROL FOR AIR TURBINE STARTER

(71) Applicant: Hamilton Sundstrand Corporation, Charlotte, NC (US)

(72) Inventors: Myles R. Kelly, Willimantic, CT (US); James S. Elder, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 198 days.

(21) Appl. No.: 15/875,920

(22) Filed: Jan. 19, 2018

(65) Prior Publication Data
US 2019/0226405 A1    Jul. 25, 2019

(51) Int. Cl.
| F02C 7/18 | (2006.01) |
| F01D 25/34 | (2006.01) |
| F02C 7/277 | (2006.01) |
| F01D 17/06 | (2006.01) |
| F02C 9/16 | (2006.01) |

(Continued)

(52) U.S. Cl.
CPC ............... *F02C 7/18* (2013.01); *F01D 17/06* (2013.01); *F01D 19/00* (2013.01); *F01D 25/34* (2013.01); *F02C 7/277* (2013.01); *F02C 9/16* (2013.01); *F01D 15/12* (2013.01);
(Continued)

(58) Field of Classification Search
CPC .... F02C 7/18; F02C 7/277; F02C 7/36; F02C 7/057; F02C 9/18; F01D 19/00; F01D 15/12
See application file for complete search history.

(56) References Cited

U.S. PATENT DOCUMENTS

| 2,818,704 A | 1/1958 | Karcher |
| 3,776,266 A | 12/1973 | Bass et al. |

(Continued)

FOREIGN PATENT DOCUMENTS

| EP | 0713815 A1 | 5/1996 |
| EP | 3351743 A1 | 7/2018 |

OTHER PUBLICATIONS

Extended European Search Report for European Patent Application No. 19151863.8, dated Sep. 20, 2019.

(Continued)

*Primary Examiner* — Kenneth J Hansen
*Assistant Examiner* — Jackson M Gillenwaters
(74) *Attorney, Agent, or Firm* — Carlson, Gaskey & Olds, P.C.

(57) ABSTRACT

An example arrangement for cooling a gas turbine engine includes an air turbine starter, a starter air valve, and an airflow adjustment device. The air turbine starter includes a turbine section for rotationally driving a compressor of a gas turbine engine through rotation of a shaft that connects the turbine section to the compressor. The starter air valve is configured to control a flow of pressurized air along a flow path from a source to turbine blades of the turbine section. The starter air valve includes a manual override feature that allows manual opening of the starter air valve. The airflow adjustment device is configured to adjust the flow of pressurized air along the flow path when the manual override feature is engaged based on a rotational speed of one of the shaft and an additional shaft that is driven by the compressor.

9 Claims, 11 Drawing Sheets

(51) Int. Cl.
*F01D 19/00* (2006.01)
*F01D 15/12* (2006.01)

(52) U.S. Cl.
CPC ...... *F05D 2220/32* (2013.01); *F05D 2260/20* (2013.01); *F05D 2270/02* (2013.01); *F05D 2270/114* (2013.01)

(56) References Cited

U.S. PATENT DOCUMENTS

| | | | |
|---|---|---|---|
| 3,915,413 A | 10/1975 | Sargisson | |
| 4,007,891 A | 2/1977 | Sorensen et al. | |
| 4,205,945 A | 6/1980 | Davis | |
| 4,275,560 A | 6/1981 | Wright et al. | |
| 4,916,893 A | 4/1990 | Rodgers | |
| 5,042,963 A * | 8/1991 | Sorenson | F02C 7/268 415/123 |
| 5,114,103 A | 5/1992 | Coffinberry | |
| 5,136,837 A | 8/1992 | Davison | |
| 5,143,329 A | 9/1992 | Coffinberry | |
| 5,237,815 A | 8/1993 | McArthur | |
| 5,927,064 A * | 7/1999 | Dyer | F01D 21/02 60/39.281 |
| 6,282,882 B1 | 9/2001 | Dudd, Jr. et al. | |
| 6,305,156 B1 | 10/2001 | Lui | |
| 6,318,958 B1 * | 11/2001 | Giesler | F01D 11/00 415/111 |
| 6,681,579 B2 * | 1/2004 | Lane | F01D 25/18 60/39.091 |
| 6,684,898 B2 * | 2/2004 | Wiggins | F02C 7/277 137/15.25 |
| 9,028,208 B2 * | 5/2015 | Zawilinski | F01D 5/141 415/191 |
| 9,845,734 B2 * | 12/2017 | Zeiner | F02C 7/277 |
| 2013/0183136 A1 | 7/2013 | Roberge et al. | |
| 2014/0373554 A1 * | 12/2014 | Pech | F02C 7/277 60/788 |
| 2016/0169217 A1 | 6/2016 | Cavatorta et al. | |
| 2017/0233103 A1 | 8/2017 | Teicholz et al. | |
| 2017/0234234 A1 | 8/2017 | Pech et al. | |
| 2017/0234235 A1 | 8/2017 | Pech | |
| 2017/0234237 A1 | 8/2017 | Pech et al. | |
| 2018/0010480 A1 * | 1/2018 | Hockaday | F01D 5/12 |
| 2018/0112600 A1 | 4/2018 | Kelly et al. | |
| 2018/0209295 A1 * | 7/2018 | Kemp | F01D 17/085 |
| 2018/0216537 A1 * | 8/2018 | Greenberg | F01D 19/02 |
| 2018/0346100 A1 * | 12/2018 | Veilleux, Jr. | F02C 7/27 |
| 2018/0355764 A1 * | 12/2018 | Clauson | F01D 21/20 |

OTHER PUBLICATIONS

Partial European Search Report for European Patent Application No. 191518618, completed May 31, 2019.

* cited by examiner

AIRFLOW CONTROL FOR AIR TURBINE STARTER

BACKGROUND

This application relates to an air turbine starter, and more particularly to airflow control for an air turbine starter.

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor.

An air turbine starter is typically included with a gas turbine engine for starting the gas turbine engine. The air turbine starter receives pressurized air from an auxiliary power unit when it is desired to start a gas turbine engine. The air turbine starter is connected to drive a compressor section of the gas turbine engine. When the air turbine starter receives the pressurized air, its turbine is driven to rotate, to in turn start rotation of the compressor section in the gas turbine engine through "motoring."

Some gas turbine engines exhibit a so-called "bowed rotor" condition whereby certain components exhibit different thermal expansion from engine use, causing a shaft of a gas turbine engine, such as the "N1" shaft that interconnects a fan, low pressure compressor, and low pressure turbine of the gas turbine engine, or "N2" shaft that interconnects a high pressure compressor and high compressor turbine, to become bowed.

Starting up and idling an engine exhibiting a bowed rotor condition without sufficiently cooling the engine is undesirable, because rotor blades may not be properly centered and may excessively rub into a housing. This poses challenges for aircraft with short turnarounds between flights, because a gas turbine engine may take several hours of standstill cooling to fully resolve a bowed rotor condition.

Low speed motoring of a gas turbine engine exhibiting a bowed rotor condition at sub-idling rotational speeds is a method to shorten the time needed for cooling.

SUMMARY

One example embodiment of an arrangement for cooling a gas turbine engine includes an air turbine starter, a starter air valve, and an airflow adjustment device. The air turbine starter includes a turbine section for rotationally driving a compressor of a gas turbine engine through rotation of a shaft that connects the turbine section to the compressor. The starter air valve is configured to control a flow of pressurized air along a flow path from a source to turbine blades of the turbine section. The starter air valve includes a manual override feature that allows manual opening of the starter air valve. The airflow adjustment device is configured to adjust the flow of pressurized air along the flow path when the manual override feature is engaged based on a rotational speed of one of the shaft and an additional shaft that is driven by the compressor.

One other example embodiment of arrangement for cooling a gas turbine engine includes an air turbine starter, an air flow adjustment device, and a governor. The air turbine starter includes a turbine section and an inlet duct in fluid communication with the turbine section. The turbine section is configured for driving a compressor of a gas turbine engine through rotation of a shaft that interconnects the turbine section and the compressor. The airflow adjustment device is configured to adjust a flow of pressurized air from a source to turbine blades of the turbine section. The governor is mechanically linked to the shaft through one or more gears and is configured to operate the airflow adjustment device to adjust the flow based on a rotational speed of one of the shaft and an additional shaft driven by the compressor, such that the rotational speed of said one of the shafts does not exceed a selected threshold during a particular operating mode.

One example embodiment of a method of motoring a gas turbine engine includes delivering a flow of pressurized air along a flow path to a turbine section of an air turbine starter. The flow path passes through a starter air valve, and the pressurized air causes the air turbine starter to rotate a compressor of a gas turbine engine through rotation of a shaft that interconnects the turbine section and the compressor. The method includes manually opening the air starter valve if needed. When the starter air valve is manually opened, a degree to which an airflow adjustment device adjusts the flow of pressurized air is controlled based on a rotational speed of one of the shaft and an additional shaft that is driven by the compressor.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
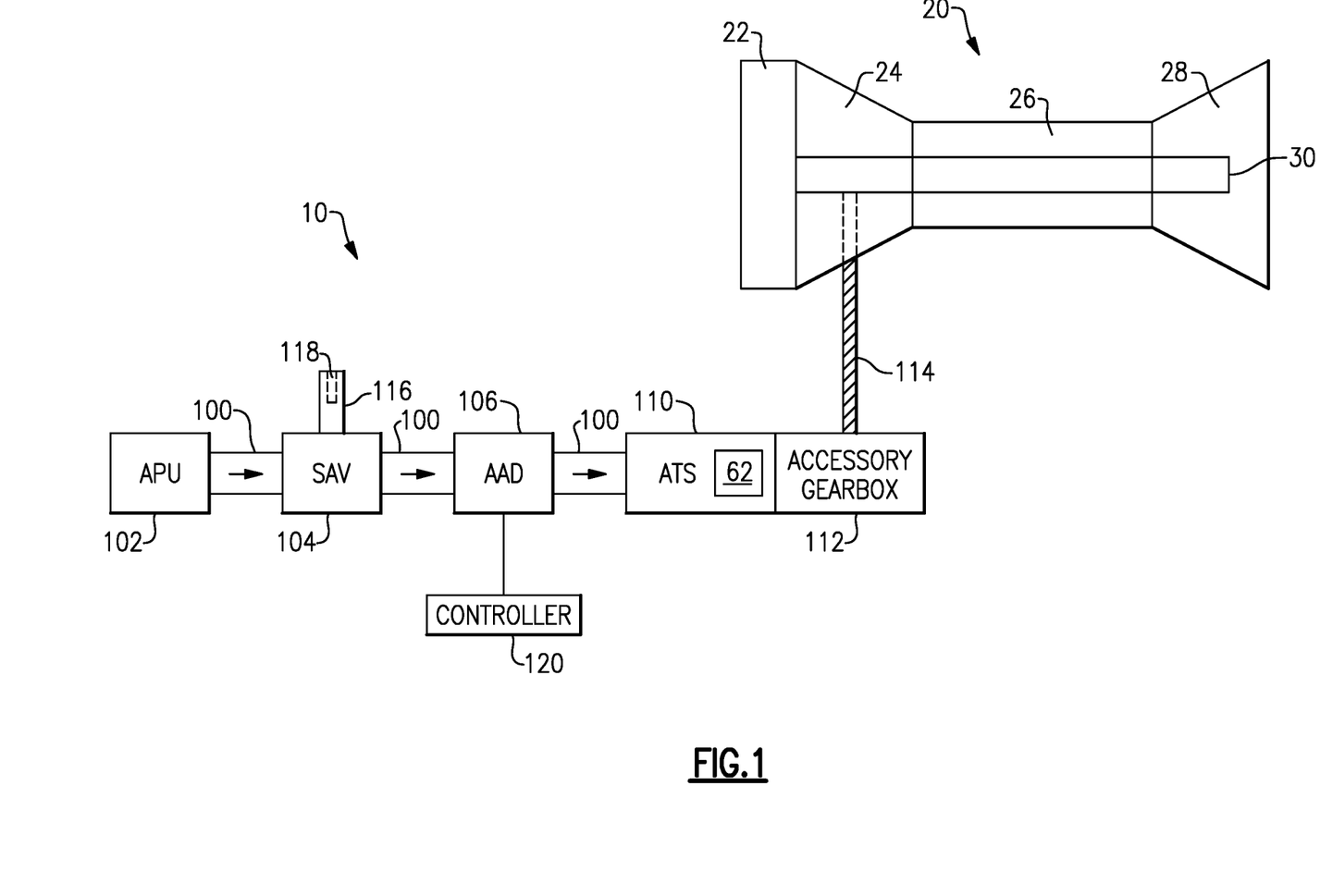
FIG. 1 is a schematic view of an arrangement for starting and cooling a gas turbine engine.

FIG. 1 is a schematic view of an example arrangement 10 for starting a gas turbine engine 20. An air turbine starter 110 is configured to drive a compressor section 24 of a gas turbine engine 20 through an accessory gearbox 112 and a driveshaft 114 at startup of the gas turbine engine 20. The air turbine starter 110 is also configured to drive the compressor section 24 for cool-down motoring of the gas turbine engine 20 when the gas turbine engine 20 exhibits a bowed rotor condition.

The cool-down motoring draws air into the gas turbine engine 20, which expedites cooling of the gas turbine engine 20 and mitigation of the bowed rotor condition The cool-down motoring is performed such that rotors of the compressor section 24 (e.g., a low pressure compressor of the compressor section 24) rotate at sub-idling rotational speeds without achieving a full start condition.

A starter air valve 104 controls a flow of pressurized air from a source 102 along an flow path 100 to the air turbine starter 110 for cool-down motoring and engine startup. In the example of FIG. 1, the source 102 is an auxiliary power unit (APU) (e.g., of an aircraft that utilizes the gas turbine engine 20). In one example, the starter air valve 104 can be activated by a button on a nacelle door, a button in an aircraft cockpit, or a switch/sensor on a nacelle door.

The starter air valve 104 may exhibit a fault condition, such as failing to open. To address this, the starter air valve 104 includes a manual override feature 116 that includes a tool interface 118 for engaging the override feature and actuating the starter air valve 104 open. The tool interface 118 may be engaged by a technician on the ground, for example. Once opened, the starter air valve 104 on its own may provide too much airflow to the air turbine starter 110, potentially driving the compressor section 24 at a rotational speed that is too fast for cool-down motoring.

An airflow adjustment device 106 is in series with the starter air valve 104 in the flow path 100, and is configured to limit the flow of pressurized air along the flow path 100 when the starter air valve 104 is manually overridden to an open position. Optionally, the airflow adjustment device 106 can also be utilized in conjunction with the starter air valve 104 when the starter air valve 104 is functioning properly. The airflow adjustment device 106 can include a valve, a resizable inlet duct of the air turbine starter 110, or adjustable vanes of the air turbine starter 110, for example.

A controller 120 controls the degree to which the airflow adjustment device 106 adjusts the flow in the flow path 100 to provide an amount of airflow to the air turbine starter 110 that will motor the gas turbine engine 20 at a sub-idle speed until a bowed rotor condition of the gas turbine engine 20 has diminished sufficiently, without achieving a full start condition.

Figure 2:
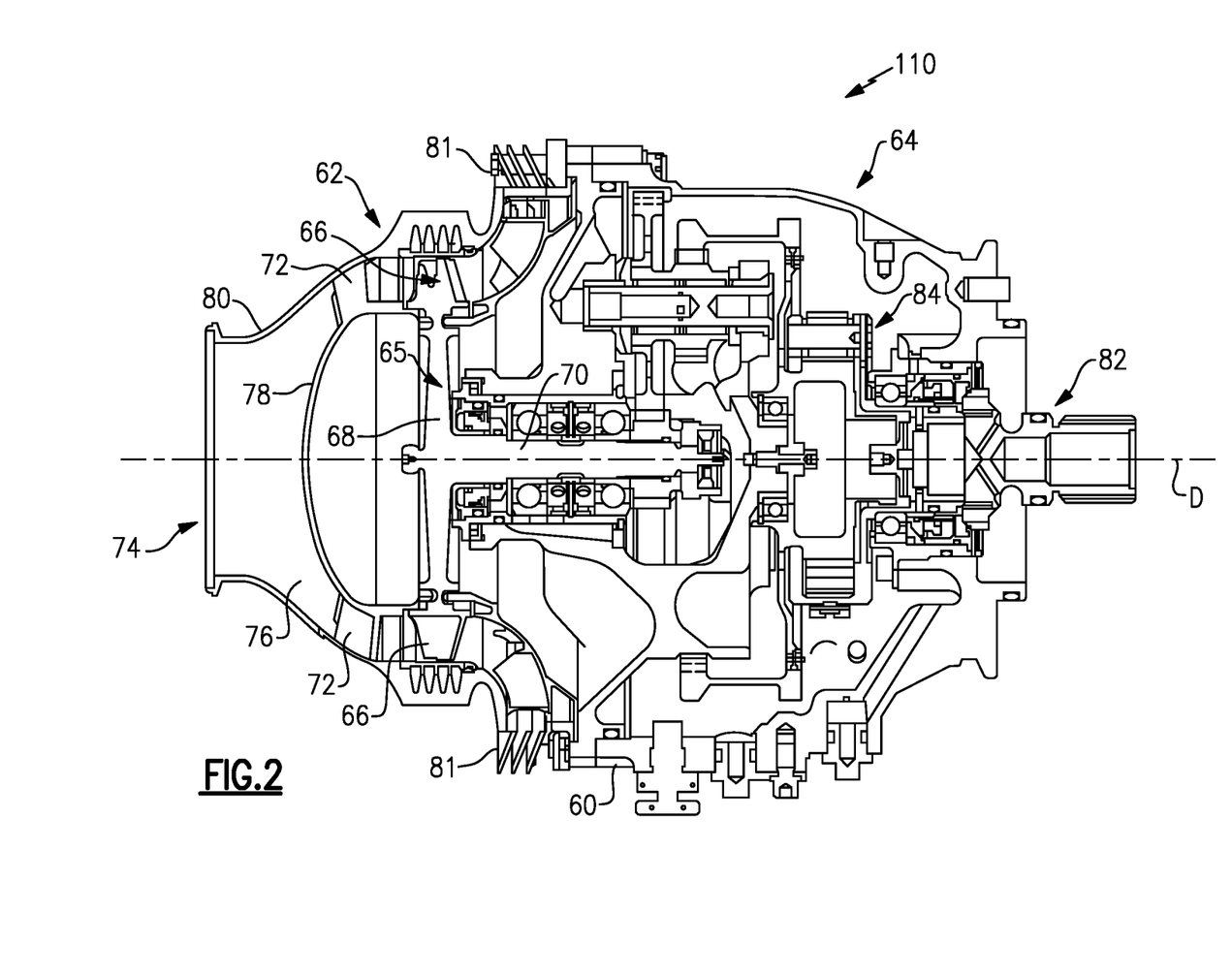
FIG. 2 is a schematic view of an example air turbine starter.

The controller 120 controls the airflow adjustment device 106 based on a rotational speed of the shaft 114 that interconnects the air turbine starter 110 to the compressor section 24 (e.g., or alternatively shaft 70 or 82 as shown in FIG. 2 that provide interconnection between the air turbine starter 110 to the compressor section 24) or based on a rotational speed of a different shaft that is driven by the compressor section 24 (e.g., the rotor shaft 30 of FIG. 1). The rotor shaft 30 interconnects a fan 22, a compressor of the compressor section 24 (e.g., a low pressure compressor), and a turbine of an engine turbine section 28 (e.g., a low pressure turbine) of the gas turbine engine 20. In one example, the rotor shaft 30 is an "inner shaft" (i.e., N1 shaft), and the gas turbine engine 20 includes an additional "outer shaft" (i.e., N2 shaft) (not shown) that is concentric with and outside of the rotor shaft 30 and interconnects a high pressure compressor of the compressor section 24 and a high pressure turbine of the engine turbine section 28. Either of the inner or outer shaft, depending on which shaft is desired to be cooled, could be used by the controller 12 as a basis for controlling the airflow adjustment device 106 in one example.

In one example, the controller 120 is configured with a mapping of rotational speeds of one of the shafts 70, 82, 114 to rotational speeds of the inner shaft and outer shaft so that the rotational speed of the measured shaft can conveniently be used as a benchmark to ensure that a rotational speed of the inner and/or outer shaft does not exceed a desired rotational speed for cool-down motoring.

In one example, the controller 120 is configured to perform cool-down motoring at a given rotational speed for a particular one of the shafts for a predefined time period. This time may be based on an engine type of the gas turbine engine 20 and/or a duration of a previous flight that the gas turbine engine 20 was just utilized for.

In one example, the controller 120 includes an electro-mechanical interface device, such as a pulse width modulated solenoid, a servomotor, or a torque motor, that controls the airflow adjustment device 106 based on input from a speed sensor 122 (see, e.g., FIG. 3) that measures a rotational speed of one of the shafts discussed above.

In another example, the controller 120 includes a mechanical governor device that is mechanically linked to one of the shafts discussed above and includes flyweights configured to move outward when a centrifugal force is applied through an increased a speed of rotation. Also, other governors may be useful in the arrangement 10.

Although the airflow adjustment device 106 is depicted downstream of the starter air valve 104 in the flow path 100, it is understood that the airflow adjustment device 106 could instead be upstream of the starter air valve 104 in the flow path 100, or could be incorporated into the air turbine starter 110.

FIG. 2 is a schematic view of an example air turbine starter 110 that is used to initiate rotation of the gas turbine engine 20 through accessory gearbox 112. The air turbine starter 110 includes a housing assembly 60 that includes a turbine section 62 and an output section 64. The turbine section 62 includes a turbine wheel 65 with a plurality of turbine blades 66, a hub 68, and a turbine rotor shaft 70. The turbine blades 66 extend radially outward from the turbine wheel 65 and are situated in the flow path 100 downstream of turbine vanes 72. The turbine vanes 72 direct pressurized air from an inlet 74 and inlet duct 76 to the turbine blades 66. The inlet duct 76 is defined by an inner wall 78 and an outer wall 80 that surrounds the inner wall 78. In the example of FIG. 2, inlet duct 76 includes a substantially cylindrical portion between inlet 74 and the inner wall 78, and a substantially annular portion radially outward of the inner wall 78.

The compressed air flows past the vanes 72, drives the turbine wheel 65, and is then exhausted through an outlet 81. The turbine wheel 65 is driven by the pressurized airflow such that the turbine rotor shaft 70 mechanically drives a starter output shaft 82 though a gear system 84, such as a planetary gear system. In the example of FIG. 2, the turbine blades 66 and turbine vanes 72 are airfoils.

The turbine rotor shaft 70 and starter output shaft 82 are collinear with a central longitudinal axis D of the air turbine starter 110. The turbine blades 66 extend radially outward from the central longitudinal axis D and rotate about the central longitudinal axis D.

In this disclosure, like reference numerals from 100 to 972 designate like elements where appropriate, and reference numerals with the addition of one-hundred or multiples thereof designate modified elements that are understood to incorporate the same features and benefits of the corresponding elements.

Figure 3:
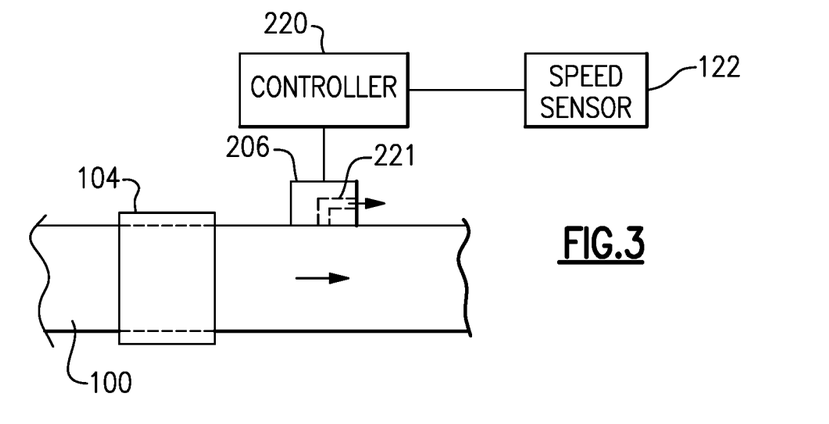
FIG. 3 is a schematic view of an example airflow adjustment device.

FIG. 3 is a schematic view of an example in which the airflow adjustment device 106 is an active bleed valve 206 configured to modulate airflow to the air turbine starter 110 by selectively releasing pressurized air from the flow path 100 through a bypass passage 221. A speed sensor 122 measures a rotational speed of a shaft, such as the turbine rotor shaft 70, starter output shaft 82, or driveshaft 114, and the controller 220 controls the active bleed valve 206 based on a difference between the measured rotational speed and a desired rotational speed of the same or another shaft (e.g., using the mapping discussed above), and adjusts the active bleed valve 206 to prevent the measured rotational speed from exceeding the desired rotational speed.

The active bleed valve 206 is normally in a closed position, but can be opened by controller 220 to release pressurized air from the flow path 100.

The controller 220 could include a pulse width modulated solenoid, a servomotor, or a torque motor that controls the active bleed valve 206, for example.

After a bowed rotor condition of the gas turbine engine 20 is mitigated, the controller 220 is configured to cause the active bleed valve 206 to fully close for starting the gas turbine engine 20.

Figure 4A:
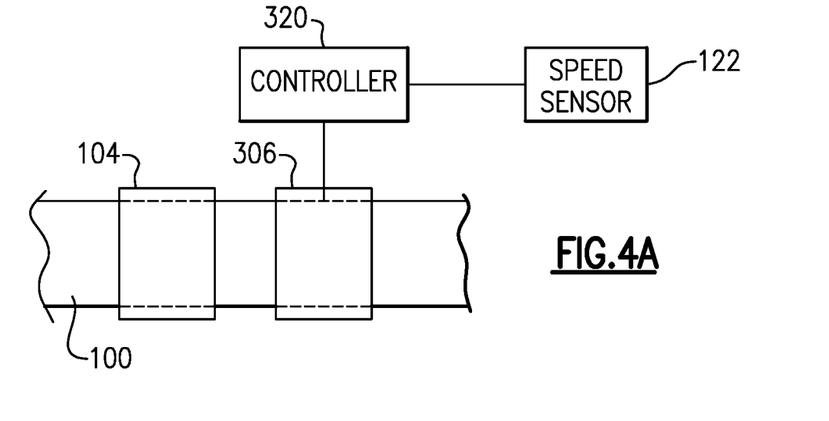
FIGS. 4A-B are schematic views of another example airflow adjustment device.
Figure 4B:
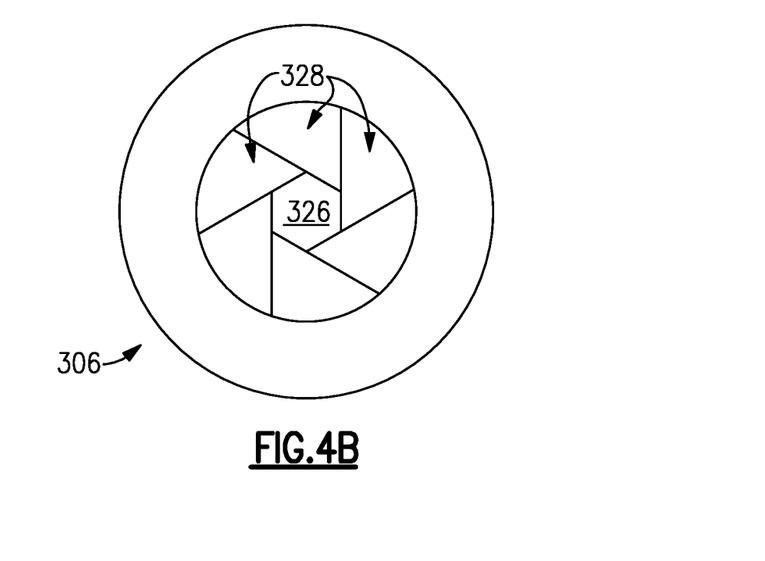

FIGS. 4A-B are schematic views of an example in which the airflow adjustment device 106 is a shutter valve 306 that has a central aperture 326 and a plurality of shutter blades 328 that are movable radially inward or radially outward from the central aperture 326 to resize the central aperture 326, and thereby alter a flow area defined by the central aperture. The controller 320 selects the size of the central aperture 326 to achieve a desired rotational speed of the air turbine starter 110, such as by starting from a default largest aperture that permits a maximum airflow to a reduced size that permits a reduced airflow, for example.

After a bowed rotor condition of the gas turbine engine 20 is mitigated, the controller 320 is configured to cause the shutter valve 306 to fully open for starting the gas turbine engine 20, and then optionally to fully close once the gas turbine engine 20 is started.

Figure 5:
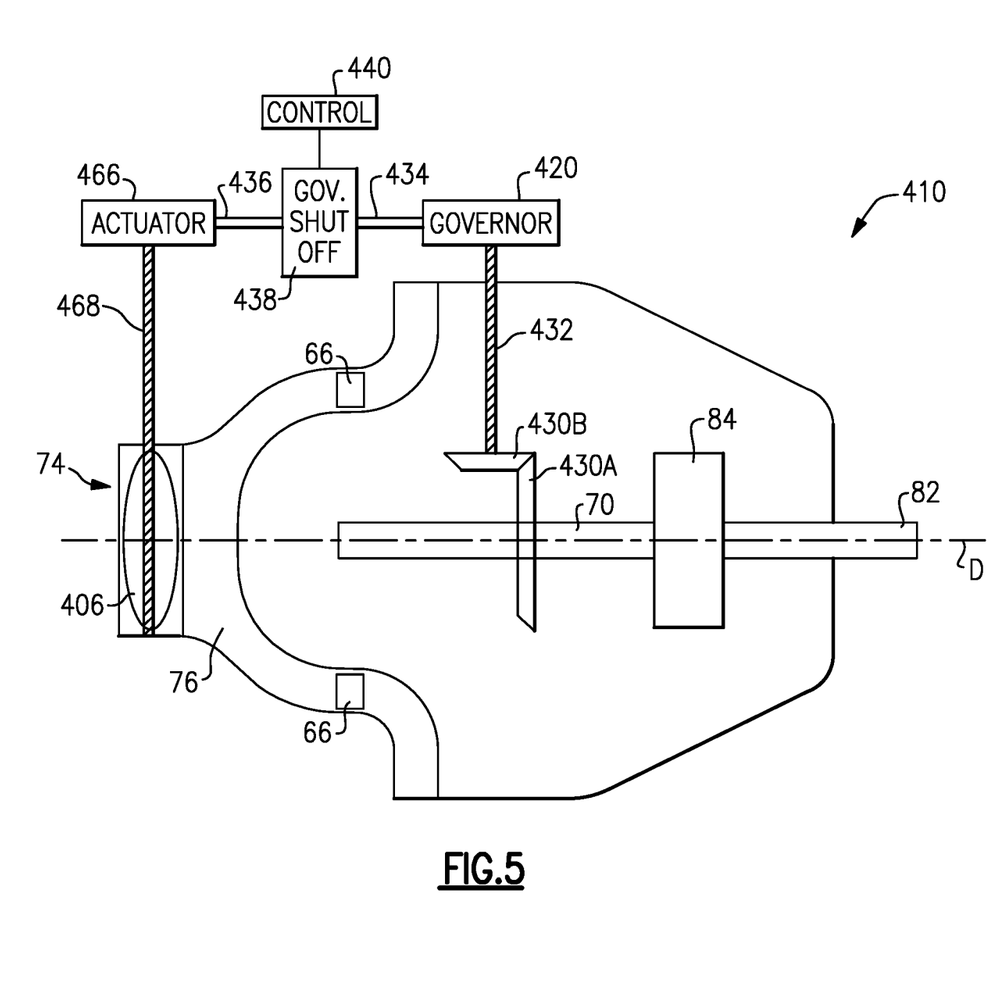
FIG. 5 is a schematic view of another example airflow adjustment device.

FIG. 5 is a schematic view of an example in which airflow adjustment device 106 is a butterfly valve 406 situated within the inlet 74 of the air turbine starter 410. In one example, the starter air valve 104 is omitted and the butterfly valve 406 is used in its place.

In the example of FIG. 5 the controller 120 is a governor 420 that is mechanically linked to the turbine rotor shaft 70 through a plurality of gears 430A-B and a shaft 432. The governor 420, gears 430, and shaft 432 are configured to adjust the butterfly valve 406 such that a rotational speed of the turbine rotor shaft 70 does not exceed a predefined threshold during a particular operating mode (e.g., during cool-down motoring of the gas turbine engine 20).

In one example, the butterfly valve 406 is normally in a fully open position, and is selectively adjusted to a more closed position by an actuator 466 that is coupled to the butterfly valve 406 through a mechanical link 468 based on a rotational speed of the turbine rotor shaft 70. The actuator 466 is driven to rotate butterfly valve 406 through increased pressure in pneumatic lines 434, 436. Alternatively, the lines 434, 436 can be other types of pressure-based lines, such as hydraulic or fueldraulic lines.

The governor 420 is fluidly connected to the actuator 432 through the pneumatic lines 434, 436 and is configured to adjust a pressure in the lines based on a rotational speed of the shaft 70. In one example, the mechanical governor 420 includes flyweights configured to move outward when a centrifugal force applied by rotation of the shaft 70 increases due to an increased rotational speed of the shaft 70. Outward movement of the flyweights causes a pressure in the lines 434, 436 to increase, driving actuator 466 to rotate the butterfly valve 406 and close the butterfly valve 406 (e.g., by the governor 420 acting as a fluid motor that increases pressure in the pneumatic lines 434, 436).

After a bowed rotor condition of the gas turbine engine 20 is mitigated, a digital control 440 utilizes a governor shut off feature 438 to cause the butterfly valve 406 to fully open (e.g., by disengaging the governor 420 from the shaft 70 or dumping pneumatic pressure in lines 434, 436) for starting the gas turbine engine 20, and then optionally fully closes the butterfly valve 406 once the gas turbine engine 20 is started (e.g., by increasing pressure in the lines 434, 436).

In another example, the gears 430 could couple the mechanical governor 420 to the starter output shaft 82 instead of to the turbine rotor shaft 70.

Although FIG. 5 depicts the butterfly valve 406 within the inlet duct 76 of the air turbine starter 410, in another example the butterfly valve 406 is situated in the flow path 100 upstream of the inlet 74.

Figure 6A:
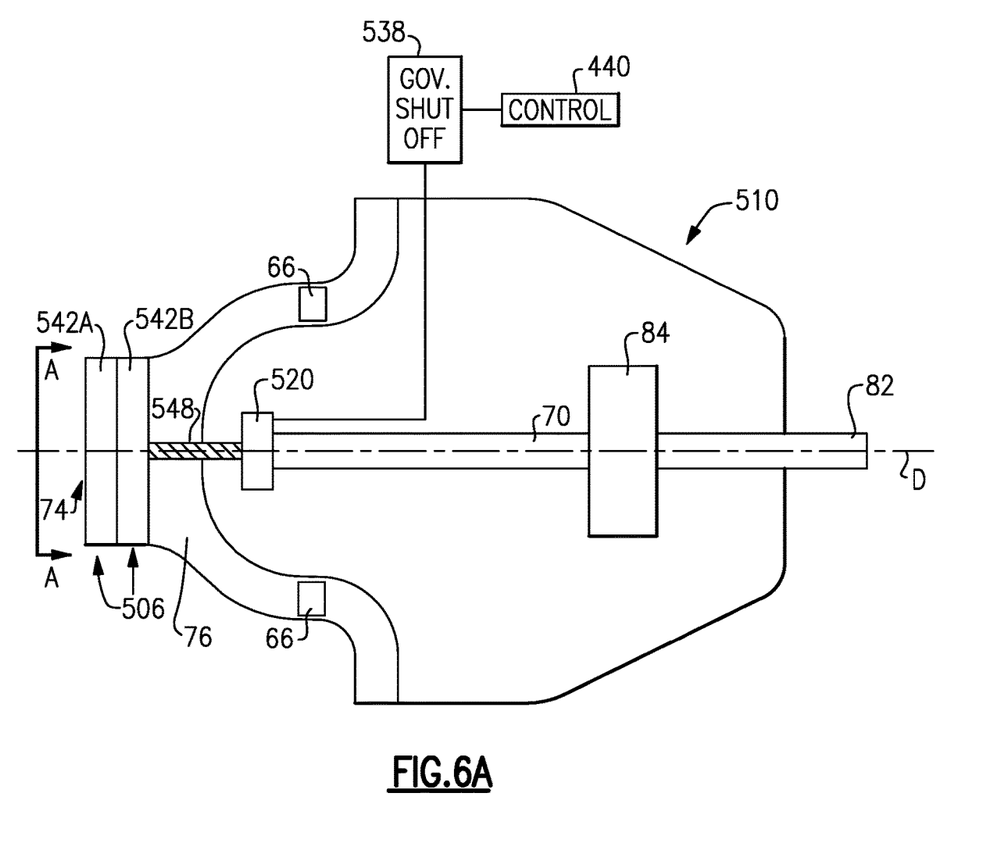
FIGS. 6A-C are schematic views of another example airflow adjustment device.
Figure 6B:
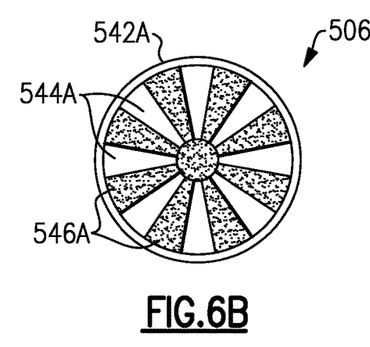
Figure 6C:
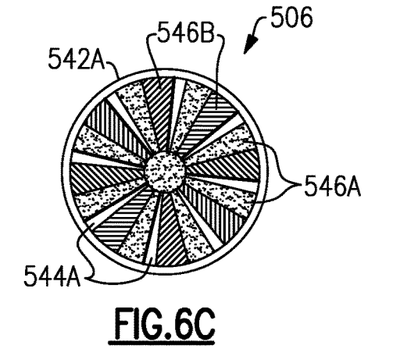

FIGS. 6A-C are schematic views of an example in which the airflow adjustment device 106 for an air turbine starter 510 is an air shutter 506 that includes two discs 542A-B that each include a plurality of spaced apart holes 544. In the example of FIG. 6A, disc 542A is stationary, while disc 542B is rotatable to selectively misalign its holes 544 with the holes 544 of the disc 542A.

FIG. 6B illustrates a view of the air shutter 506 taken along line A-A of FIG. 6A. The disc 542A includes a plurality of wedge-shaped radially extending holes 544A separated by wedge-shaped radially extending dividers 546A. The disc 542B is situated behind the disc 542A but is not visible because its holes are aligned with the holes 544A of the disc 542A.

FIG. 6C illustrates another view of the air shutter 506 taken along line A-A of FIG. 6A in which the holes of the discs 542A-B are partially misaligned. In particular, the dividers 546B of the disc 542B partially obstruct the holes 544A of disc 542A.

In one example, the openings 544 of the discs 542A-B are fully aligned by default and are biased to that fully aligned position. Referring again to FIG. 6A, a governor 520 is configured to selectively restrict the flow of pressurized air through misalignment of airflow holes 544 in the two discs 542A-B. In particular, the governor 520 controls a degree to which the holes 544 of the discs 542A-B are misaligned and deviate from the default fully aligned position. The governor 520 co-rotates with the turbine rotor shaft 70, and is mechanically linked to disc 542B through shaft 548.

In one example, the mechanical governor 520 includes flyweights configured to move outward when a centrifugal force applied by rotation of the shaft 70 increases due to an increased rotational speed of the shaft 70. Outward movement of the flyweights causes extension of the shaft 548 along the central longitudinal axis D and/or rotation of the shaft 548 about the central longitudinal axis D, thereby increasing a misalignment between the openings 544 in the discs 542A-B and limiting airflow to the turbine blades 66 of the air turbine starter 510.

After a bowed rotor condition of the gas turbine engine 20 is mitigated, a governor shut off feature 538 is configured to disengage the governor 520 from the shaft 70 and/or shaft 548 as part of an electromechanical clutch, causing the air shutter 506 to return to a default, fully open position for starting the gas turbine engine 20.

Figure 7:
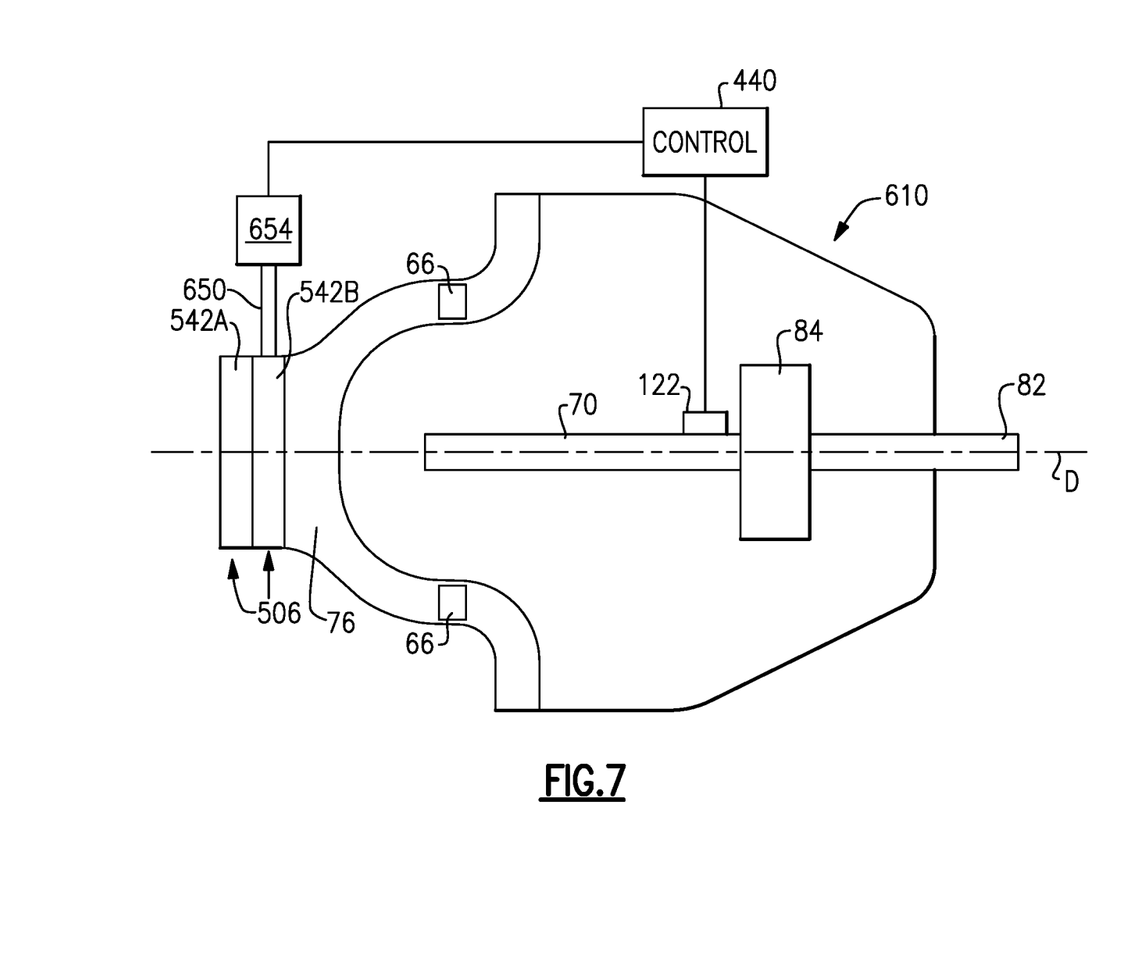
FIG. 7 is a schematic view of the airflow adjustment device of FIGS. 6A-C using a different control arrangement.

FIG. 7 is a schematic view of an example air turbine starter 610 that utilizes the air shutter 506 of FIGS. 6A-C with a different control arrangement. Instead of utilizing a mechanical governor 520, in FIG. 7 the digital control 440 receives input from speed sensor 122 that measures a rotational speed of the turbine rotor shaft 70 (or another of the shafts discussed above such as shafts 30, 82, 114), compares that to a desired rotational speed, and electronically commands a shutter actuator 654 to adjust a rotational position of disc 542B based on the difference between the two rotational speeds. The adjustment is performed using a mechanical link 650 between the actuator 654 and the disc 542B.

After a bowed rotor condition of the gas turbine engine 20 is mitigated, the digital control 440 is configured to cause the actuator 654 rotate the disc 542B to a fully open position for starting the gas turbine engine 20, and then optionally to a fully closed position once the gas turbine engine 20 is started. The governor shut off feature 538 is controlled by the digital control 440.

In the examples discussed above, disc 542A is stationary and disc 542B rotates. In another example, disc 542B is stationary and disc 542A rotates. In another example, both of the discs 542A-B rotate.

Figure 8A:
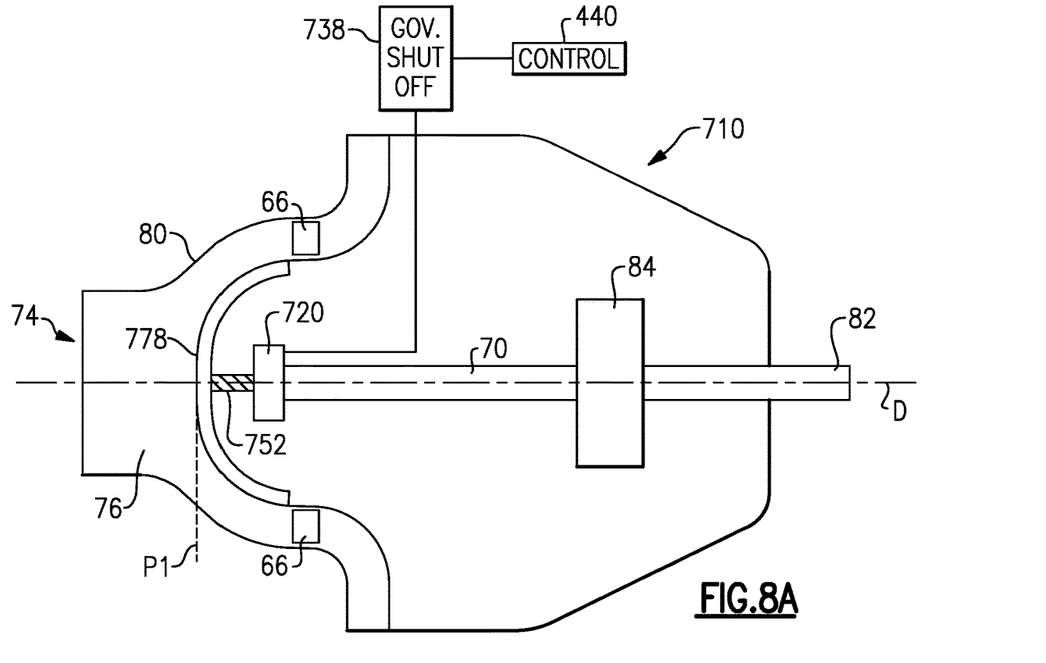
FIGS. 8A-B are schematic views of another example airflow adjustment device.
Figure 8B:
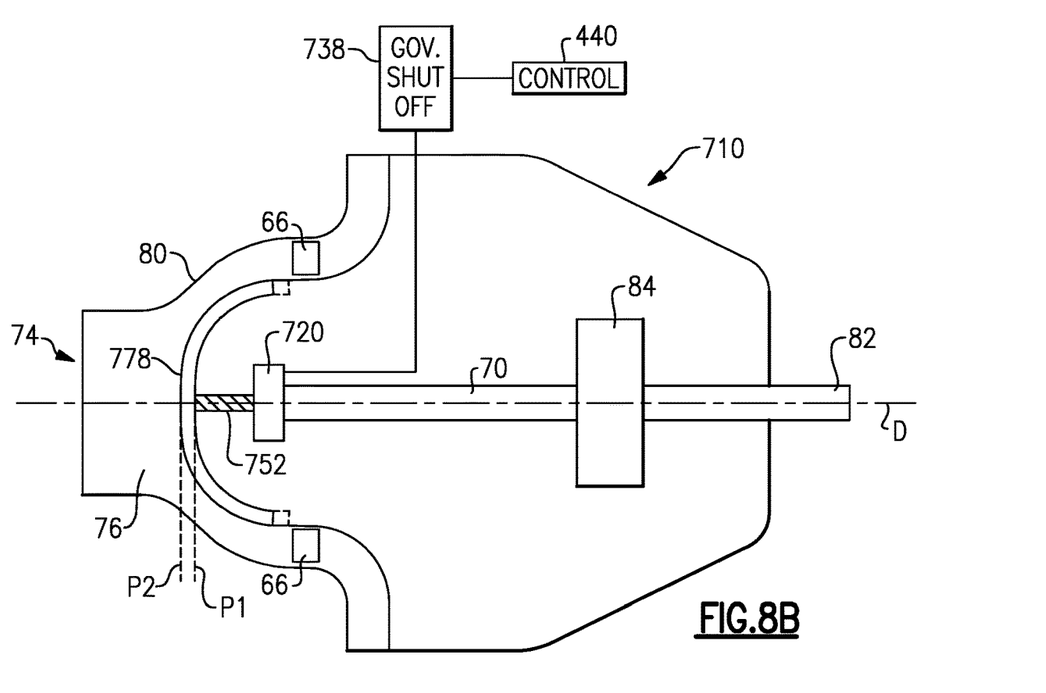

FIGS. 8A-B are schematic views of an example air turbine starter 710 in which inner wall 778 of inlet duct 76 acts as an airflow adjustment device 106. The inner wall 778 is movable along the central longitudinal axis D from a first position P1 shown in FIG. 8A (and in dotted lines in FIG. 8B) to a second position P2 towards the inlet 74. In position P2, the inner wall 778 is closer to the outer wall 80 and inlet 74, and a volume of the inlet duct 76 is reduced. Thus, the inlet duct 76 in FIGS. 8A-B provides for a variable inlet to the air turbine starter 710.

This movement is performed by a mechanical governor 720 that corotates with the turbine rotor shaft 70, and is mechanically linked to the inner wall 778 through a shaft 752. In one example, the governor 720 includes flyweights configured to move outward when a centrifugal force applied by rotation of the shaft 70 increases due to an increased rotational speed of the shaft 70. Outward movement of the flyweights causes extension of the shaft 752 and inner wall 778 along the central longitudinal axis D, which reduces a volume of the inlet duct 76.

After a bowed rotor condition of the gas turbine engine 20 is mitigated, a governor shut off feature 738 is configured to disengage the governor 720 from the shaft 70 and/or shaft 548 as part of an electromechanical clutch, causing the inner wall 778 to return to a default, fully open position (e.g., position P1) for starting the gas turbine engine 20.

Figure 9:
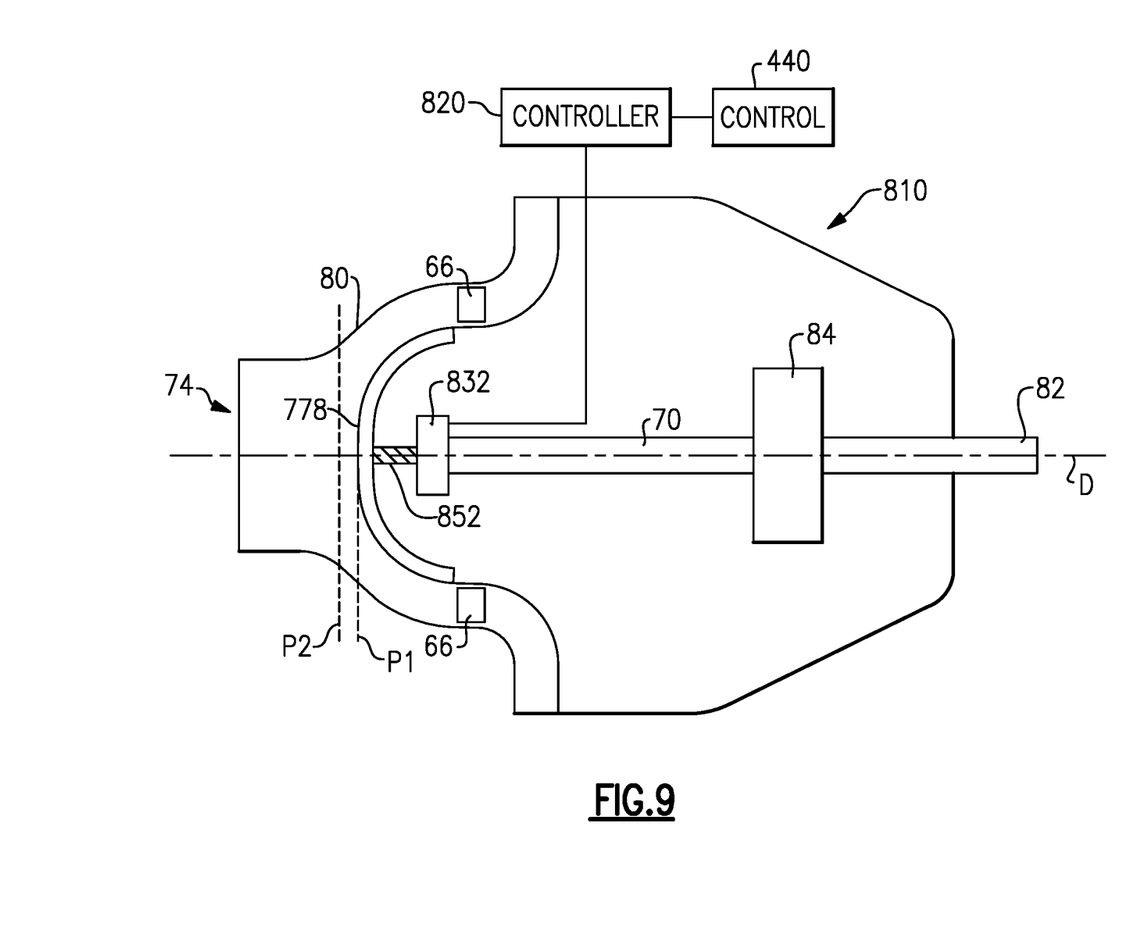
FIG. 9 is a schematic view of the device of FIGS. 8A-B using a different control arrangement.

FIG. 9 is a schematic view of an air turbine starter 810 that utilizes the airflow adjustment device of FIGS. 8A-B with an electronic control arrangement instead of a mechanical governor. In particular, a controller 820 electrically controls an actuator 832 to move the inner wall 778 from position P1 (where it is located in FIG. 9) to position P2 by extending shaft 852 along the central longitudinal axis D. The controller 820 is controllable by digital control 440 (e.g., to cause the actuator 832 to retract the inner wall 778 towards the actuator 832 to a fully open position for starting the gas turbine engine 20, and then optionally back towards the inlet 74 to a fully closed position once the gas turbine engine 20 is started).

Figure 10A:
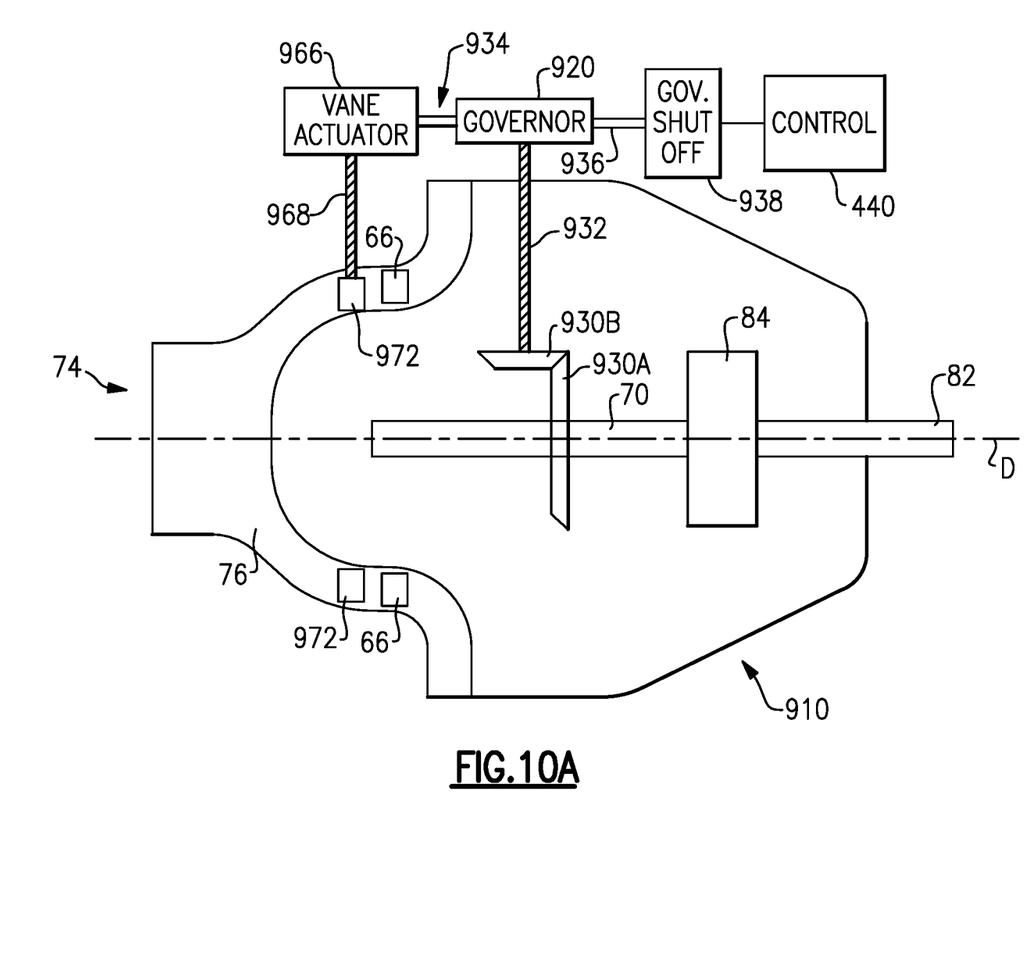
FIGS. 10A-B are schematic views of another example airflow adjustment device.
Figure 10B:
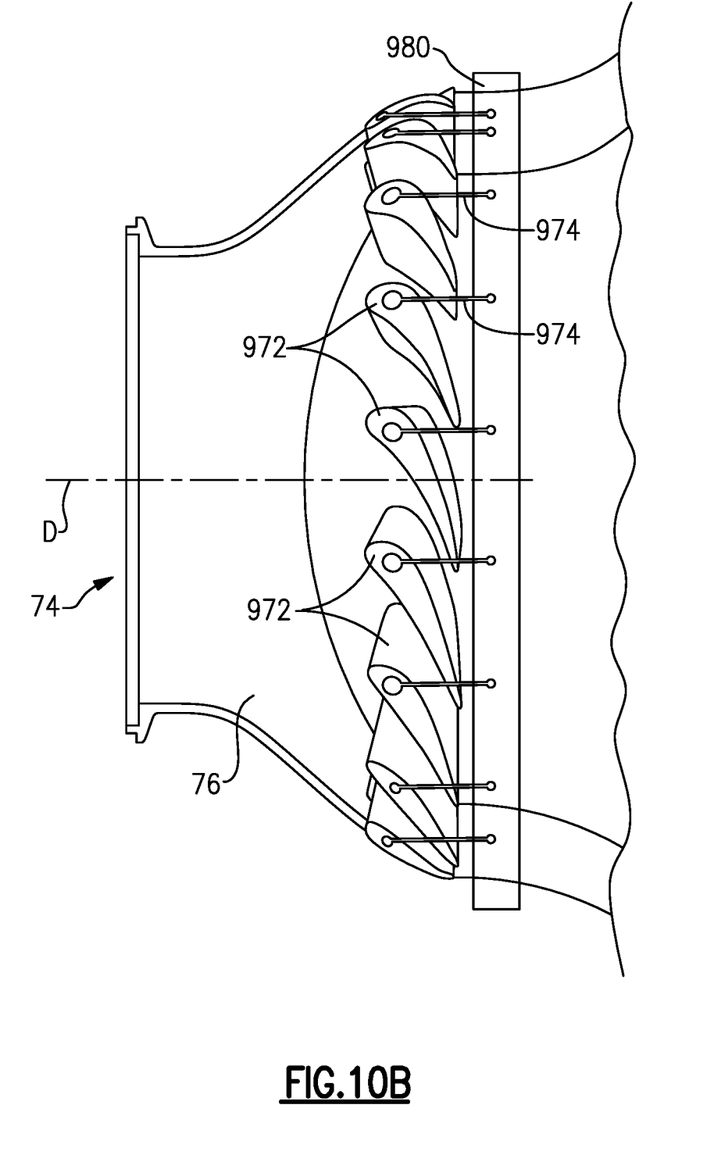

FIGS. 10A-B are schematic views of an example in which an air turbine starter 910 utilizes a sync-ring 980 (see FIG. 10B) as an airflow adjustment device 106. When the sync-ring 980 is rotated about the central longitudinal axis D, the sync-ring 980 adjusts vane angles of a plurality of variable vanes 972. The control scheme here is similar to that of FIG. 5.

In this example, the controller 120 is a governor 920 that is mechanically linked to the turbine rotor shaft 70 through a plurality of gears 930A-B and a shaft 932. The governor 920, gears 930, and shaft 932 are configured to adjust the sync-ring 980 to implement a vane angle such that a rotational speed of the turbine rotor shaft 70 does not exceed a predefined threshold during a particular operating mode (e.g., during cool-down motoring of the gas turbine engine 20).

The governor 920 is fluidly connected to vane actuator 966 through pneumatic line 934 and is configured to adjust a pressure in the pneumatic line 934 based on a rotational speed of the shaft 70. In one example, the governor 920 includes flyweights configured to move outward when a centrifugal force applied by rotation of the shaft 70 increases due to an increased rotational speed of the shaft 70. Outward movement of the flyweights causes a pressure in the line 934 to increase, driving vane actuator 966 to adjust the sync-ring 980 by applying pressure to the vane actuator 966, which moves mechanical link 968 to rotate the sync-ring 980 about axis D. Alternatively, the line 934 can be a hydraulic or fueldraulic line.

As shown in FIG. 10B, the sync-ring 980 is coupled to the various variable vanes 972 through couplings 974. When the sync-ring 980 rotates about the axis D, vane angles of the variable vanes 972 are adjusted. Referring again to FIG. 10A, a governor shut off feature 938 can be activated by an digital control 440 to disengage the governor 920 via line 936 (e.g., to disengage the shaft 932 as part of an electromechanical clutch) and cause the variable vanes 972 to return to an original vane angle.

In the example of FIGS. 10A-B and the various other examples discussed above, the digital control 440 and/or controller 120 can be configured to determine how long motoring of the gas turbine engine 20 should occur.

Figure 11:
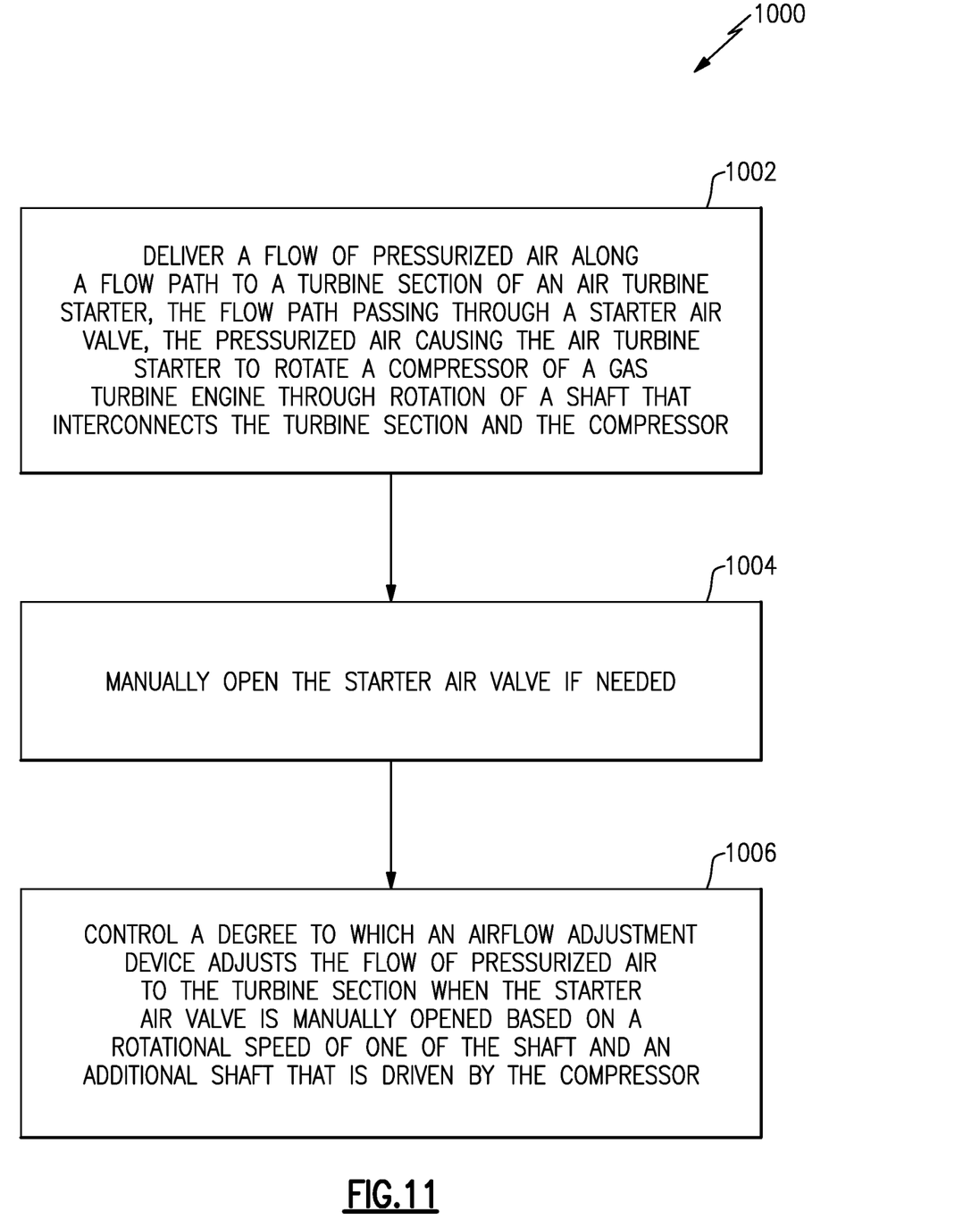
FIG. 11 is a diagram representative of an example method of cooling a gas turbine engine.

FIG. 11 is a diagram representative of an example method 1000 of cooling a gas turbine engine 20. A flow of pressurized air is delivered (block 1002) along a flow path 100 to a turbine section 62 of an air turbine starter 110. The flow path 100 passes through a starter air valve 104 and causes the air turbine starter 110 to rotate a compressor of a gas turbine engine 20 through rotation of a shaft (e.g., shaft 70, 82, or 114) that interconnects the turbine section 62 and the compressor. The starter air valve 104 is manually opened if needed (block 1004). A degree to which airflow adjustment device 106 adjusts the flow of pressurized air to the turbine section 62 when the starter air valve 104 is manually opened is controlled based on a rotational speed of one of the shaft and an additional shaft that is driven by the compressor (block 1006).

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An arrangement for cooling a gas turbine engine comprising:
   an air turbine starter comprising a turbine section for rotationally driving a compressor of a gas turbine engine through rotation of a shaft that connects the turbine section to the compressor, the turbine section including a plurality of turbine blades that extend radially outward from a central longitudinal axis;
   a starter air valve configured to control a flow of pressurized air along a flow path from a source to turbine blades of the turbine section, the starter air valve having a manual override feature that allows manual opening of the starter air valve; and an airflow adjustment device configured to adjust the flow of pressurized air along the flow path when the manual override feature is engaged based on a rotational speed of one of the shaft and an additional shaft that is driven by the compressor;

wherein the air turbine starter comprises an inlet duct that fluidly connects the plurality of turbine blades to the source of pressurized air, and the airflow adjustment device comprises an inner wall of the inlet duct that is movable along the central longitudinal axis to adjust a volume of the inlet duct.

2. The arrangement of claim 1, further comprising a control device configured to control a degree to which the air flow adjustment device adjusts the flow.

3. The arrangement of claim 2, further comprising:
a speed sensor configured to measure a rotational speed of said one of the shafts;
wherein the control device comprises an electrical controller in communication with the speed sensor and configured to control a degree to which the airflow adjustment device adjusts the flow based on a difference between the measured rotational speed of said one of the shafts and a desired rotational speed of said one of the shafts.

4. The arrangement of claim 2, wherein the control device comprises a governor mechanically linked to the shaft through one or more gears and configured to adjust the airflow adjustment device such that a rotational speed of said one of the shafts does not exceed a predefined threshold during a particular operating mode.

5. The arrangement of claim 4, comprising a governor shutoff device configured to disable the governor by disengaging the governor from the shaft or adjusting a pressure in a pressure-based control line that connects the governor to an actuator for the airflow adjustment device.

6. An arrangement for cooling a gas turbine engine comprising:
an air turbine starter comprising a turbine section and an inlet duct in fluid communication with the turbine section, the turbine section configured for driving a compressor of a gas turbine engine through rotation of a shaft that interconnects the turbine section and the compressor;
an airflow adjustment device configured to adjust a flow of pressurized air from a source to turbine blades of the turbine section, the turbine blades extending radially outward from a central longitudinal axis of the air turbine starter; and
a governor mechanically linked to the shaft through one or more gears and configured to operate the airflow adjustment device to adjust the flow based on a rotational speed of one of the shaft and an additional shaft driven by the compressor, such that the rotational speed of said one of the shafts does not exceed a selected threshold during a particular operating mode;
wherein the inlet duct fluidly connects the plurality of turbine blades to the source of pressurized air, and the airflow adjustment device comprises an inner wall of the inlet duct that is movable along the central longitudinal axis to adjust a volume of the inlet duct.

7. The arrangement of claim 6, comprising a governor shutoff device configured to disable the governor by disengaging the governor from the shaft or adjusting a pressure in a pressure-based control line that connects the governor to an actuator for the airflow adjustment device.

8. A method of cooling a gas turbine engine, comprising:
delivering a flow of pressurized air along a flow path to a turbine section of an air turbine starter, the flow path passing through a starter air valve, the pressurized air causing the air turbine starter to rotate a compressor of a gas turbine engine through rotation of a shaft that interconnects the turbine section and the compressor;
manually opening the starter air valve if needed; and
controlling a degree to which an airflow adjustment device adjusts the flow of pressurized air to the turbine section when the starter air valve is manually opened based on a rotational speed of one of the shaft and an additional shaft that is driven by the compressor;
wherein said airflow adjustment device comprises a movable inner wall of an inlet duct of the air turbine starter that is in fluid communication with the turbine section; and
wherein said controlling a degree to which the airflow adjustment device reduces the flow of pressurized air comprises adjusting a volume of the inlet duct by moving the inner wall along a central longitudinal axis of the air turbine starter.

9. The method of claim 8, comprising
detecting a fault condition in the starter air valve, wherein said controlling is performed based on the detected fault condition.

* * * * *